(12) United States Patent
Nagatomo et al.

(10) Patent No.: US 11,858,209 B2
(45) Date of Patent: Jan. 2, 2024

(54) FABRICATING APPARATUS AND METHOD FOR ALTERING THE KINETIC ENERGY OF LIQUID DROPLETS

(71) Applicants: Yuji Nagatomo, Kanagawa (JP); Kenichiroh Hashimoto, Kanagawa (JP); Hisataka Takagi, Kanagawa (JP); Takuei Nishio, Kanagawa (JP)

(72) Inventors: Yuji Nagatomo, Kanagawa (JP); Kenichiroh Hashimoto, Kanagawa (JP); Hisataka Takagi, Kanagawa (JP); Takuei Nishio, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/215,557

(22) Filed: Mar. 29, 2021

(65) Prior Publication Data

US 2021/0299953 A1   Sep. 30, 2021

(30) Foreign Application Priority Data

Mar. 31, 2020   (JP) ................... 2020-064977

(51) Int. Cl.
*B29C 64/165* (2017.01)
*B33Y 10/00* (2015.01)
(Continued)

(52) U.S. Cl.
CPC ............ *B29C 64/165* (2017.08); *B22F 10/14* (2021.01); *B22F 10/30* (2021.01); *B29C 64/209* (2017.08);
(Continued)

(58) Field of Classification Search
CPC ... B29C 64/165; B29C 64/209; B29C 64/393; B29C 64/321; B22F 10/14; B22F 10/30;
(Continued)

(56) References Cited

U.S. PATENT DOCUMENTS

2003/0206820 A1* 11/2003 Keicher ................ B23K 26/32
                                                        419/9
2007/0087564 A1*  4/2007 Speakman .......... H01M 10/052
                                                        438/674
(Continued)

FOREIGN PATENT DOCUMENTS

CN       105415673 A      3/2016
JP       2016-150458 A    8/2016
(Continued)

OTHER PUBLICATIONS

Chinese Office Action dated May 6, 2022 corresponding to Chinese patent application No. 202110353187.3.
(Continued)

*Primary Examiner* — Francisco W Tschen
*Assistant Examiner* — Guy F Mongelli
(74) *Attorney, Agent, or Firm* — Harness, Dickey & Pierce, P.L.C.

(57) ABSTRACT

A fabricating apparatus includes a powder layer forming device, a fabrication liquid discharge device, and processing circuitry. The powder layer forming device is configured to form a powder layer. The fabrication liquid discharge device is configured to discharge fabrication liquid onto the powder layer. The processing circuitry is configured to control the fabrication liquid discharge device to discharge the fabrication liquid with a first kinetic energy and then discharge the fabrication liquid with a second kinetic energy higher than the first kinetic energy.

18 Claims, 8 Drawing Sheets

(51) Int. Cl.
  *B33Y 30/00* (2015.01)
  *B33Y 50/02* (2015.01)
  *B29C 64/209* (2017.01)
  *B29C 64/393* (2017.01)
  *B22F 10/14* (2021.01)
  *B22F 10/30* (2021.01)

(52) U.S. Cl.
  CPC ............ *B29C 64/393* (2017.08); *B33Y 10/00* (2014.12); *B33Y 30/00* (2014.12); *B33Y 50/02* (2014.12)

(58) Field of Classification Search
  CPC ...... B22F 2999/00; B22F 10/38; B22F 3/003; B22F 12/53; B22F 12/57; B33Y 10/00; B33Y 30/00; B33Y 50/02; B33Y 40/00; Y02P 10/25
  See application file for complete search history.

(56) References Cited

U.S. PATENT DOCUMENTS

| | | | |
|---|---|---|---|
| 2009/0020920 A1 | 1/2009 | Kumagai et al. | |
| 2010/0176063 A1* | 7/2010 | Kokotov | B01D 17/00 210/708 |
| 2014/0065194 A1* | 3/2014 | Yoo | B33Y 40/00 425/375 |
| 2014/0374933 A1* | 12/2014 | Flitsch | E01C 23/0966 425/62 |
| 2016/0075085 A1 | 3/2016 | Sasaki | |
| 2017/0056970 A1* | 3/2017 | Chin | B22D 11/01 |
| 2019/0022930 A1* | 1/2019 | Hinch | B29C 67/00 |
| 2019/0039310 A1* | 2/2019 | Busbee | A43B 13/026 |
| 2019/0232557 A1* | 8/2019 | Hart | B29C 64/20 |
| 2019/0240730 A1* | 8/2019 | Haider | B33Y 30/00 |
| 2019/0263058 A1* | 8/2019 | Tuck | B33Y 70/00 |
| 2022/0234058 A1* | 7/2022 | Singer | B05B 5/0255 |

FOREIGN PATENT DOCUMENTS

| | | | | |
|---|---|---|---|---|
| JP | 2017-202569 | 11/2017 | | |
| WO | WO-2014197732 A2 * | 12/2014 | ......... | B29C 48/0022 |

OTHER PUBLICATIONS

Extended European Search Report dated Jul. 14, 2021 issued in corresponding European Appln. No. 21165948.7.

* cited by examiner

FIG. 9A
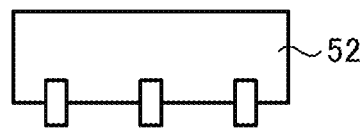
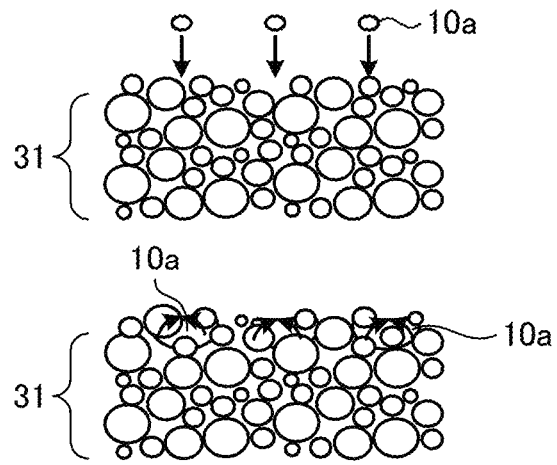
FIG. 9B
FIG. 9C
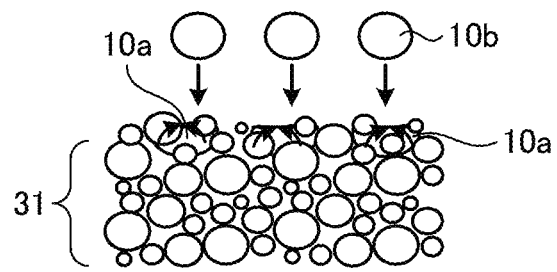
FIG. 9D
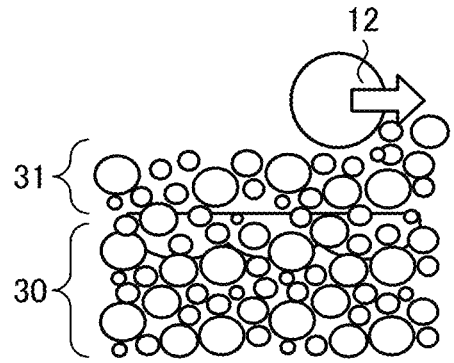
FIG. 9E
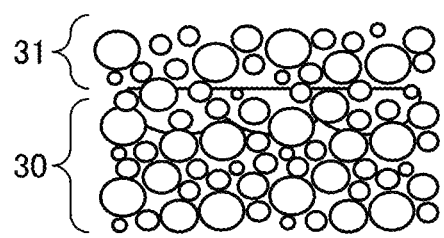

FABRICATING APPARATUS AND METHOD FOR ALTERING THE KINETIC ENERGY OF LIQUID DROPLETS

CROSS-REFERENCE TO RELATED APPLICATION

This patent application is based on and claims priority pursuant to 35 U.S.C. § 119(a) to Japanese Patent Application No. 2020-064977, filed on Mar. 31, 2020, in the Japan Patent Office, the entire disclosure of which is hereby incorporated by reference herein.

BACKGROUND

Technical Field

Embodiments of the present disclosure relate to a fabricating apparatus and a fabricating method.

Description of the Related Art

There is known a lamination fabrication method of laminating, for example, resin or metal based on cross-sectional data of a three-dimensional object to fabricate the three-dimensional object. A powder lamination fabrication method is known as one example of the lamination fabrication method. A powder bed fusion method, a binder jetting method, and the like are also known as examples of the powder lamination fabrication methods.

The powder bed fusion method is a method in which laminated metal powder is irradiated with laser light and sintered to form a fabricated object. Further, a fabrication liquid jetting method is a method in which fabrication liquid is discharged onto laminated powder and solidified to form a fabricated object.

There is known a liquid discharge apparatus that performs cleaning on a liquid discharge head in accordance with the condition. When a discharge abnormality of the liquid discharge head is detected, the contact pressure of a blade member against a discharge port surface is made larger than a predetermined contact pressure, or at least one of a preliminary discharge operation and a suction operation of sucking liquid in the liquid discharge head is performed, in accordance with the presence or absence of adhesion of a fixed substance to the discharge port surface.

SUMMARY

In an aspect of the present disclosure, a fabricating apparatus includes a powder layer forming device, a fabrication liquid discharge device, and processing circuitry. The powder layer forming device is configured to form a powder layer. The fabrication liquid discharge device is configured to discharge fabrication liquid onto the powder layer. The processing circuitry is configured to control the fabrication liquid discharge device to discharge the fabrication liquid with a first kinetic energy and then discharge the fabrication liquid with a second kinetic energy higher than the first kinetic energy.

In another aspect of the present disclosure, a fabricating method includes forming, first discharging, and second discharging. The forming forms a powder layer. The first discharging discharges first fabrication liquid with a first kinetic energy to a first region of the powder layer. The second discharging discharges second fabrication liquid with a second kinetic energy higher than the first kinetic energy to a second region at least partially overlapping with the first region.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 9A, 9B, 9C, 9D, and 9E are diagrams illustrating droplet discharge control of a three-dimensional fabricating apparatus according to an embodiment of the present disclosure.

Figure 1:
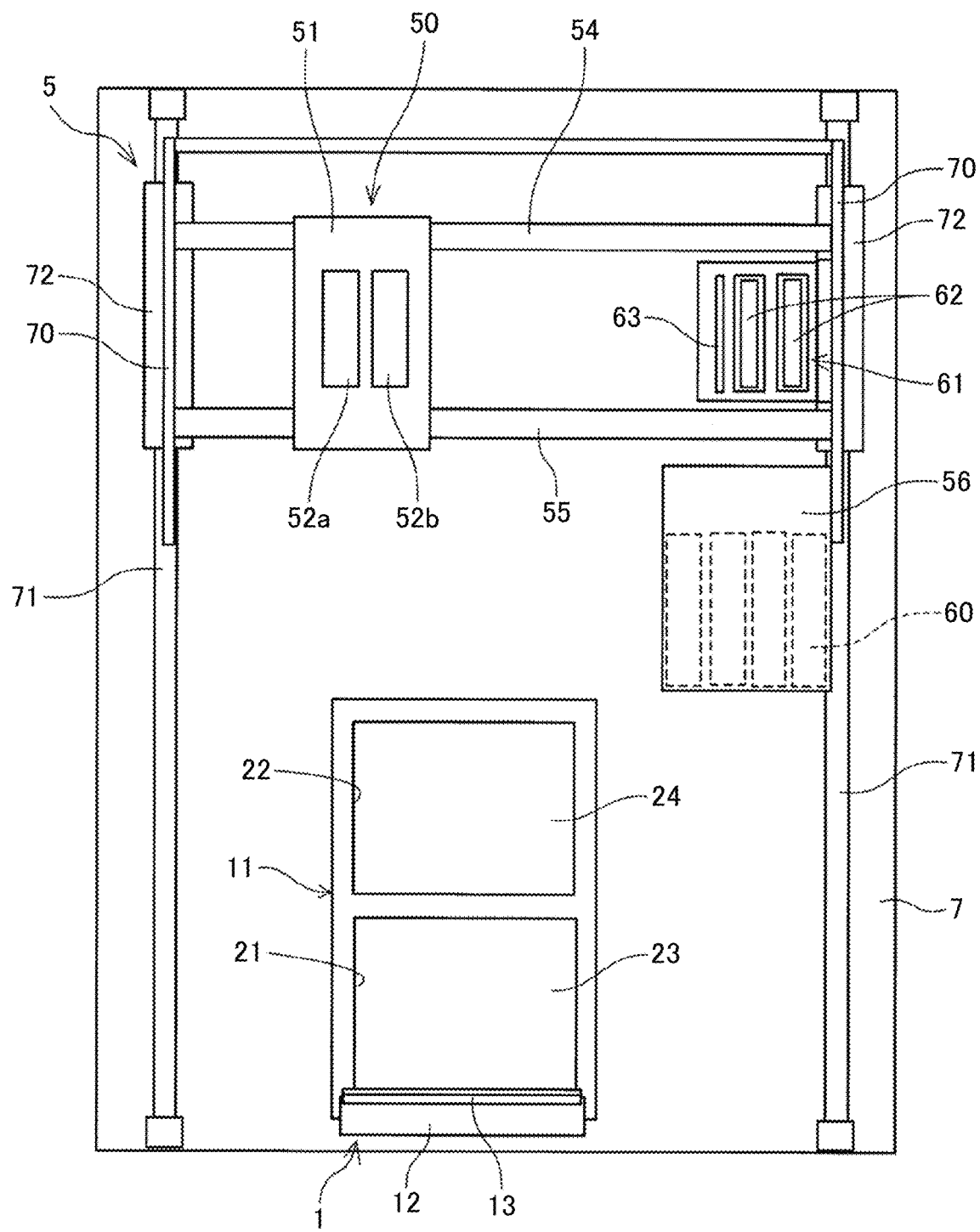
FIG. 1 is a top view of a three-dimensional fabricating apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, a three-dimensional fabricating apparatus according to embodiments of the present disclosure will be described with reference to the accompanying drawings.

External configuration of three-dimensional modeling apparatus

Figure 2:
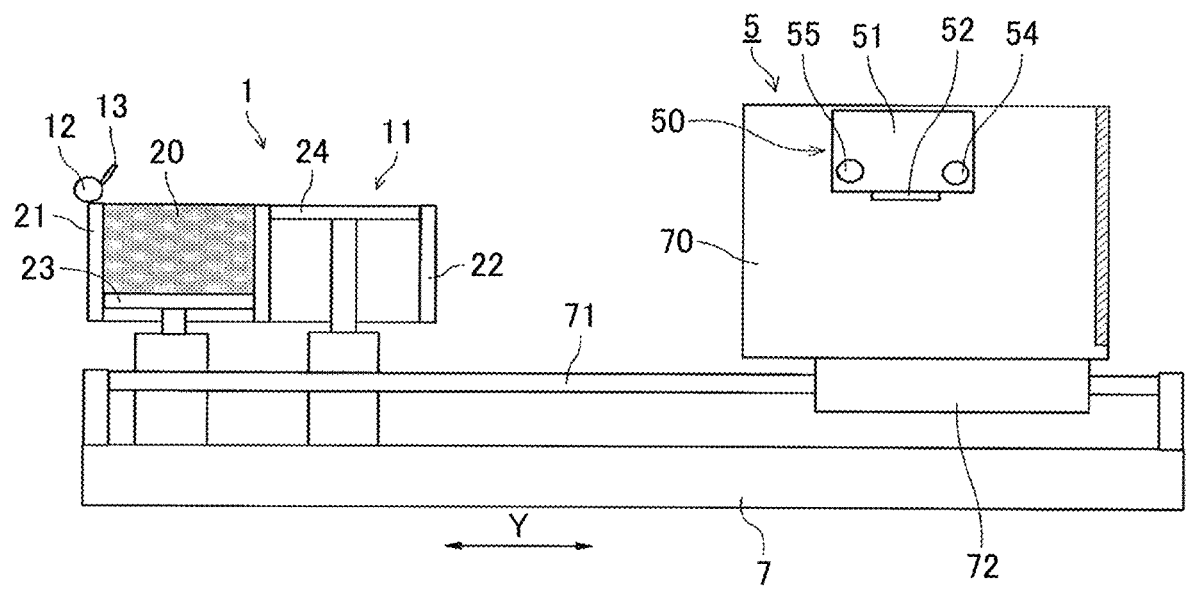
FIG. 2 is a side view of a three-dimensional fabricating apparatus illustrated with a part of the three-dimensional fabricating apparatus being cut away according to an embodiment of the present disclosure.
Figure 3:
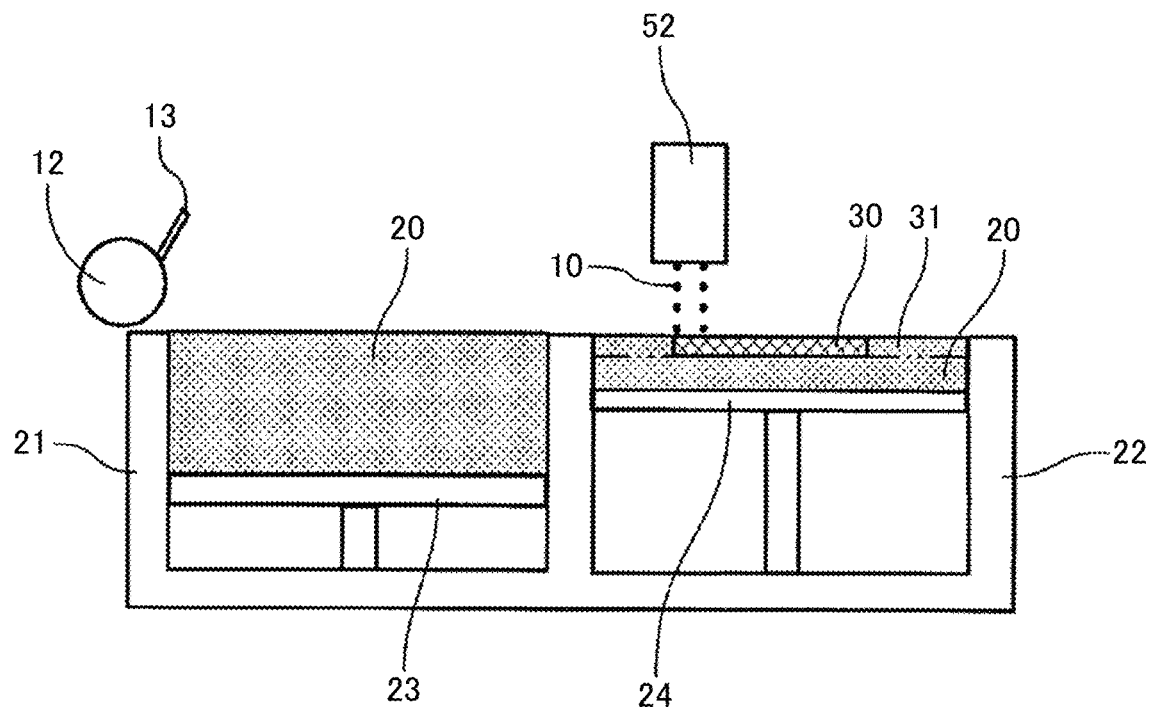
FIG. 3 is a cross-sectional view of a powder chamber of a three-dimensional fabricating apparatus according to an embodiment of the present disclosure.
Figure 4:
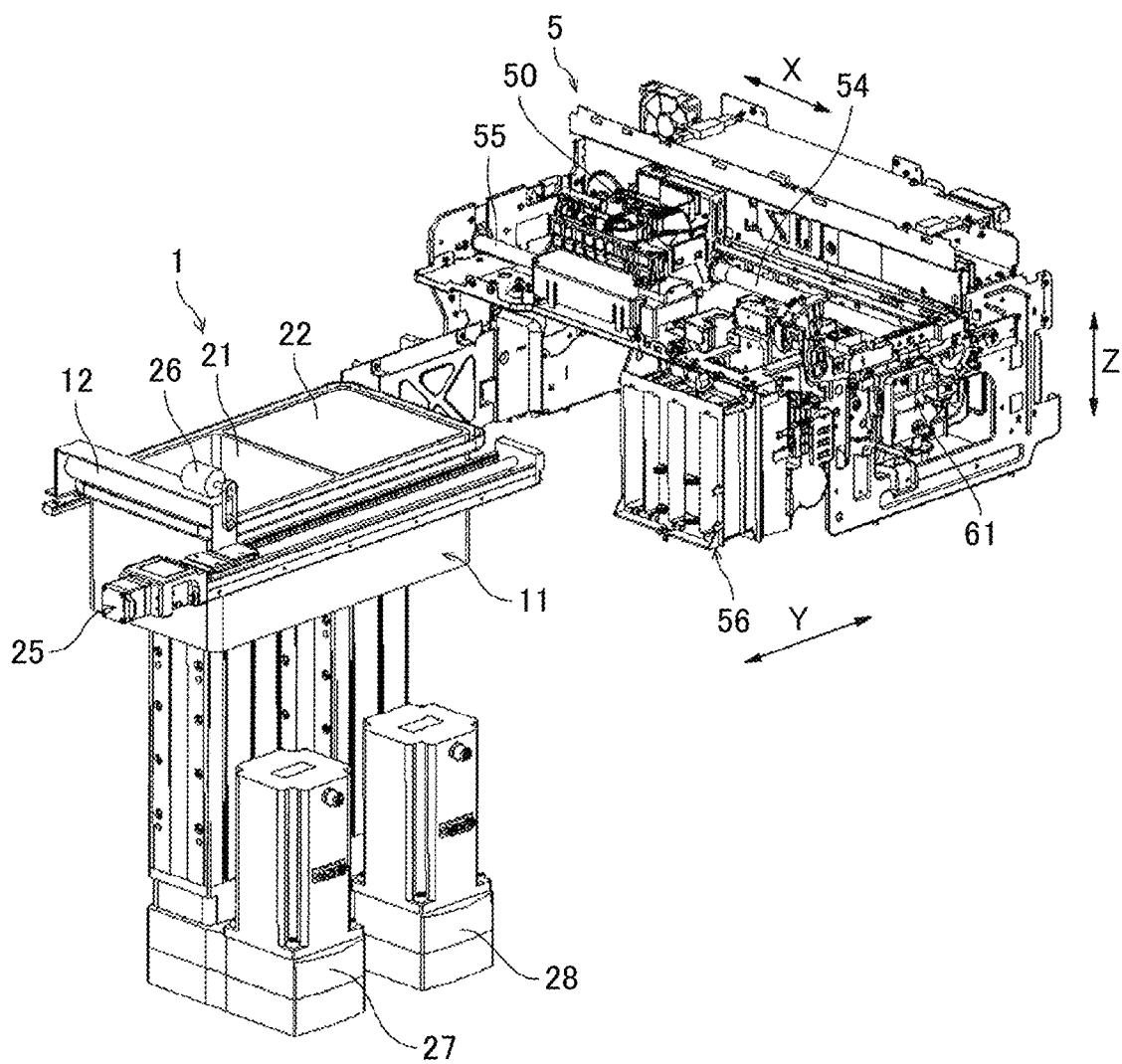
FIG. 4 is a perspective view of a main part of a three-dimensional fabricating apparatus according to an embodiment of the present disclosure.
Figure 5:
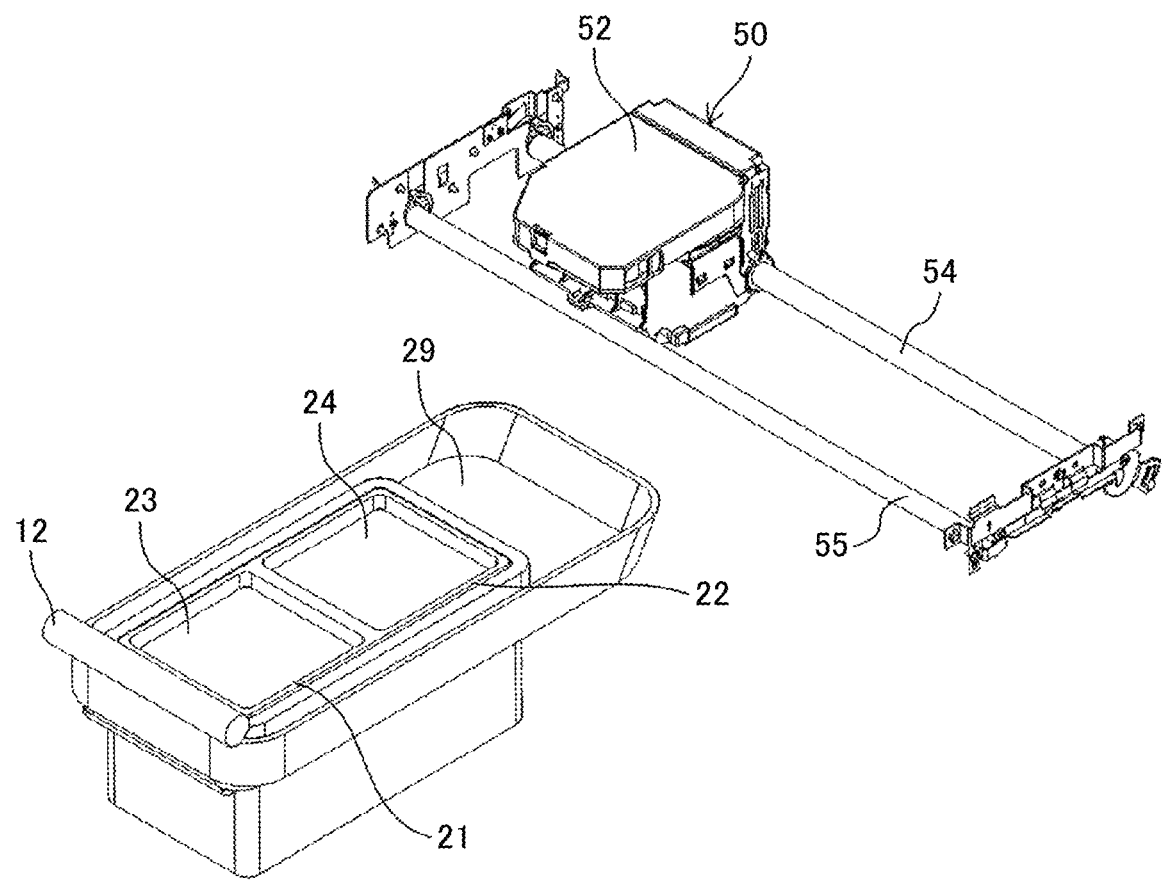
FIG. 5 is a perspective view of a powder chamber and a liquid discharge unit of a three-dimensional fabricating apparatus according to an embodiment of the present disclosure.

FIG. 1 is a top view of a three-dimensional fabricating apparatus (an example of a fabricating apparatus) according to an embodiment of the present disclosure. FIG. 2 is a side view of the three-dimensional fabricating apparatus illustrated with a part of the three-dimensional fabricating apparatus cut away according to an embodiment of the present disclosure. FIG. 3 is a cross-sectional view of a powder chamber of the three-dimensional fabricating apparatus according to an embodiment of the present disclosure. FIG. 4 is a perspective view of a main part of the three-dimensional fabricating apparatus according to an embodiment of the present disclosure. FIG. 5 is a perspective view of the powder chamber and a perspective view of a liquid discharge unit of the three-dimensional fabricating apparatus according to an embodiment of the present disclosure.

A three-dimensional fabricating apparatus 601 (also referred to as a powder fabricating apparatus or a powder-particle fabricating apparatus) according to embodiments of the present disclosure includes a fabricating device 1 and a fabricating unit 5. The fabricating device 1 forms a fabrication layer 30, which is a layered three-dimensional object formed by binding powder (powder particles). The fabricating unit 5 discharges a fabrication liquid 10 to a powder layer 31 spread in a layered manner in the fabricating device 1 to fabricate a three-dimensional object.

The fabricating device 1 is an example of a powder layer forming device and includes a powder chamber 11 and a flattening roller 12 as a rotator which is a flattening member (recoater). The flattening member may be, for example, a plate (blade) in place of a rotator.

The powder chamber 11 includes a supply chamber 21 to supply powder 20 and a fabrication chamber 22 in which the fabrication layer 30 is laminated to fabricate a three-dimensional object. A bottom of the supply chamber 21 is movable in a vertical direction (height direction) as a supply stage 23. Similarly, a bottom of the fabrication chamber 22 is movable in the vertical direction (height direction) as a fabrication stage 24. A three-dimensional object in which the fabrication layer 30 is laminated is fabricated on the fabrication stage 24.

For example, as illustrated in FIG. 4, the supply stage 23 is moved up and down in directions indicated by arrow Z (height direction) by a motor 27. Similarly, the fabrication stage 24 is moved up and down in the directions indicated by arrow Z by a motor 28. Hereinafter, the directions indicated by arrow Z simply referred to as "Z directions".

The powder chamber 11 has a box shape, and includes two chambers, i.e., the supply chamber 21 and the fabrication chamber 22, each having an open upper surface. The supply stage 23 is disposed inside the supply chamber 21 so as to be raised and lowered. The fabrication stage 24 is disposed inside the fabrication chamber 22 so as to be raised and lowered.

Side faces of the supply stage 23 are disposed so as to be in contact with inner side faces of the supply chamber 21. Side faces of the fabrication stage 24 are disposed so as to be in contact with inner side faces of the fabrication chamber 22. Upper surfaces of the supply stage 23 and the fabrication stage 24 are kept horizontal.

As illustrated in FIG. 5, a surplus powder receiving chamber 29 including the peripheries of the supply chamber 21 and the fabrication chamber 22 is provided adjacent to the fabrication chamber 22. The powder 20 is transferred by the flattening roller 12 when the powder layer 31 is formed, and a surplus of the powder 20 falls into the surplus powder receiving chamber 29. A powder supply device 554 (see FIG. 6) is provided above the supply chamber 21, and the surplus powder 20 that has fallen into the surplus powder receiving chamber 29 is returned to the supply chamber 21 by the powder supply device 554.

During an initial operation of fabricating or when the amount of powder in the supply chamber 21 decreases, the powder in a tank of the powder supply device 554 is supplied to the supply chamber 21. Examples of a method of conveyance of the powder for powder supply include a screw conveyor method using a screw, an air conveyance method using air, or the like.

The flattening roller 12 supplies the powder 20 supplied onto the supply stage 23 of the supply chamber 21 to the fabrication chamber 22 and flattens the powder 20 to form the powder layer 31. The flattening roller 12 is moved by a reciprocating mechanism 25 so as to reciprocate (in directions indicated by arrow Y (hereinafter, Y directions) illustrated in FIGS. 2 and 4 relative to a stage surface (surface on which the powder 20 is placed) of the fabrication stage 24. The flattening roller 12 is rotationally driven by a motor 26.

The flattening roller 12 transfers and supplies the powder 20 from the supply chamber 21 to the fabrication chamber 22, and flattens the surface of the powder 20 to form the powder layer 31 which is a layered powder having a predetermined thickness. The flattening roller 12 is a rod-shaped member longer than the inner dimension of each of the fabrication chamber 22 and the supply chamber 21 (the width of a portion to which the powder is supplied or charged), and is reciprocated in the Y directions (in other words, along a sub-scanning direction) along the stage surface of the fabrication stage 24 by the reciprocating mechanism 25.

The flattening roller 12 is rotationally driven by the motor 26 illustrated in FIG. 4 to horizontally move to pass above the supply chamber 21 and the fabrication chamber 22 from the outside of the supply chamber 21. Thus, the powder 20 is transferred and supplied onto the fabrication chamber 22, and the flattening roller 12 flattens the powder 20 while passing over the fabrication chamber 22 to form the powder layer 31.

Further, as illustrated in FIG. 2, the flattening roller 12 is provided with a powder removing plate 13. The powder removing plate 13 moves together with the flattening roller 12 in a state in which the powder removing plate 13 is in contact with a peripheral surface of the flattening roller 12, and removes the powder 20 adhering to the flattening roller 12.

The three-dimensional fabricating apparatus 601 according to the present embodiment is described on the assumption that the powder chamber 11 of the fabricating device 1 includes the two chambers, i.e., the supply chamber 21 and the fabrication chamber 22. However, only the fabrication chamber 22 may be provided and the powder 20 may be supplied from a powder supply device to the fabrication chamber 22 and flattened by the flattening roller 12.

The fabricating unit 5 includes a liquid discharge unit 50 that discharges the fabrication liquid 10 to the powder layer 31 on the fabrication stage 24. The fabricating unit includes a slider 72 movably held by a guide 71 disposed on a base 7, and the entire fabricating unit 5 can reciprocate in the Y directions (in other words, along the sub-scanning direction) orthogonal to directions indicated by arrow X (hereinafter, X directions) in FIG. 4. The entire fabricating unit 5 is reciprocated in the Y direction by a Y-direction scanning mechanism 552 (illustrated in FIG. 6) described later.

The liquid discharge unit 50 is an example of a fabrication liquid discharge unit and includes a carriage 51 and, for example, two liquid discharge heads (hereinafter simply referred to as "heads") 52a and 52b provided on the carriage 51. Note that the number of heads is not limited to two and may be one or three or more. The liquid discharge unit 50 is provided to be movable up and down in the Z directions illustrated in FIG. 4 together with guides 54 and 55, and is moved up and down in the Z directions by a Z-direction lifting mechanism 551 (illustrated in FIG. 6) described later.

The carriage 51 (see FIG. 1) is movably held by the guide 54 and the guide 55. The guide 54 and the guide 55 are held by side plates 70 on both sides of the fabricating unit 5 so as to be movable vertically. The carriage 51 is reciprocated by an X-direction scanning mechanism 550 (illustrated in FIG. 6), which will be described later, via a main scanning movement mechanism including a motor, a pulley, and a belt, in the X directions which are main scanning directions.

In each of the two heads 52a and 52b (hereinafter, referred to as "heads 52" when not distinguished from each other), two nozzle rows are arranged in which a plurality of nozzles that discharge the fabrication liquid 10 are aligned. The head configuration and the liquid to be discharged are not limited to the above-described configuration. A plurality of tanks 60 containing these liquids are mounted on a tank mounter 56. The liquid in each tank 60 is supplied to the heads 52a and 52b via supply tubes or the like.

A maintenance mechanism 61 that performs maintenance and recovery of the heads 52 of the liquid discharge unit 50 is provided on one side in the X direction. The maintenance mechanism 61 includes caps 62 and a wiper 63. The maintenance mechanism 61 brings the caps 62 into close contact with the nozzle surfaces (the surfaces on which the nozzles are formed) of the heads 52 and sucks the fabrication liquid 10 from the nozzles to discharge the powder clogged in the nozzles and the fabrication liquid having a high viscosity. Thereafter, the nozzle surface of the heads 52 are wiped by the wiper 63 to form meniscuses of the nozzles (in a state in which the inside of the nozzles is in a negative pressure state). When the fabrication liquid 10 is not discharged, the maintenance mechanism 61 covers the nozzle surfaces of the heads 52 with the caps 62 to prevent mixing of the powder 20 into the nozzles and drying of the fabrication liquid 10.

Hardware Configuration

Figure 6:
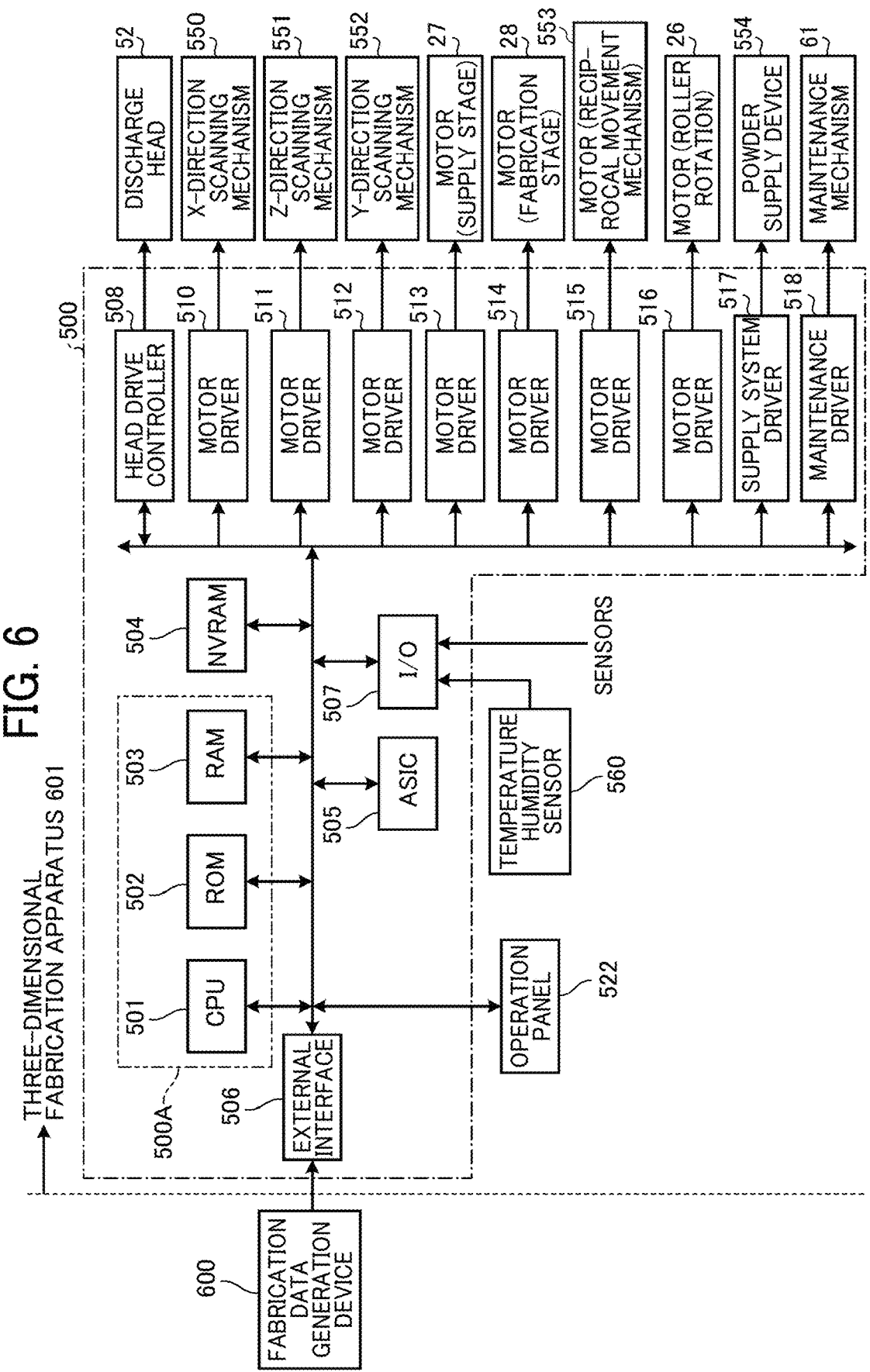
FIG. 6 is a block diagram of a hardware configuration of a three-dimensional fabricating apparatus according to an embodiment of the present disclosure.

FIG. 6 is a block diagram of a hardware configuration of the three-dimensional fabricating apparatus 601 according to an embodiment of the present disclosure. In FIG. 6, a controller 500 of the three-dimensional fabricating apparatus 601 includes a central processing unit (CPU) 501, a read only memory (ROM) 502, a random access memory (RAM) 503, and a non-volatile random access memory (NVRAM) 504. The CPU 501 controls the entire three-dimensional fabricating apparatus 601. The ROM 502 stores various programs such as a fabrication program for causing the CPU 501 to execute three-dimensional fabrication control other than fixed data and the like. The RAM 503 temporarily stores fabrication data and the like. The NVRAM 504 is a non-volatile memory that retains data even while the device is powered off. The CPU 501, the ROM 502, and the RAM 503 mainly form a main control unit 500A.

The controller 500 includes an application specific integrated circuit (ASIC) 505 that processes input and output signals for controlling the entire three-dimensional fabricating apparatus 601 in addition to various signal processing performed on image data. The controller 500 includes an external interface (external I/F) 506 for transmitting and receiving fabrication data and the like to and from a fabrication data generation apparatus 600, which is an external device.

The fabrication data generation apparatus 600 is an apparatus that generates fabrication data obtained by slicing a fabricated object in a final form into fabrication layers, and includes an information processing apparatus such as a personal computer.

Further, the controller 500 includes an input and output unit (I/O) 507 for capturing detection signals of various sensors, and a head drive controller 508 that controls driving of each of the heads 52a and 52b of the liquid discharge unit 50. The CPU 501 and the head drive controller 508 are examples of a discharge controller.

The controller 500 includes a motor driver 510 that drives a motor of a X-direction scanning mechanism 550 to move the carriage 51 of the liquid discharge unit 50 in the X directions (i.e., the main scanning directions), and a motor driver 512 that drives a motor of a Y-direction scanning mechanism 552 to move the fabricating unit 5 in the Y directions (or along the sub-scanning directions).

In addition, the controller 500 includes a motor driver 511 to that drives a motor of a Z-direction lifting mechanism 551 to move (lift up and down) the carriage 51 of the liquid discharge unit 50 in the Z directions. The elevation in the Z directions may elevate the entire fabricating unit 5.

The controller 500 includes a motor driver 513 that drives a motor 27 to raise and lower the supply stage 23, and a motor driver 514 that drives a motor 28 to raise and lower the fabrication stage 24. The controller 500 includes a motor driver 515 that drives a motor 553 of the reciprocating mechanism 25 to move the flattening roller 12, and a motor driver 516 that drives the motor 26 to rotationally drive the flattening roller 12.

Further, the controller 500 includes a supply system driver 517 that drives the powder supply device 554 to supply the powder 20 to the supply chamber 21, and a maintenance driver 518 that drives the maintenance mechanism 61 of the liquid discharge unit 50.

The I/O 507 of the controller 500 is supplied with detection signals indicating temperature and humidity as environmental conditions of the three-dimensional fabricating apparatus 601, which are detected by a temperature and humidity sensor 560, and is also supplied with detection signals of other sensors. An operation panel 522 for inputting and displaying information necessary for the three-dimensional fabricating apparatus 601 is connected to the controller 500.

Note that a three-dimensional fabricating system includes the fabrication data generation apparatus 600 and the three-dimensional fabricating apparatus 601.

Figure 7A:
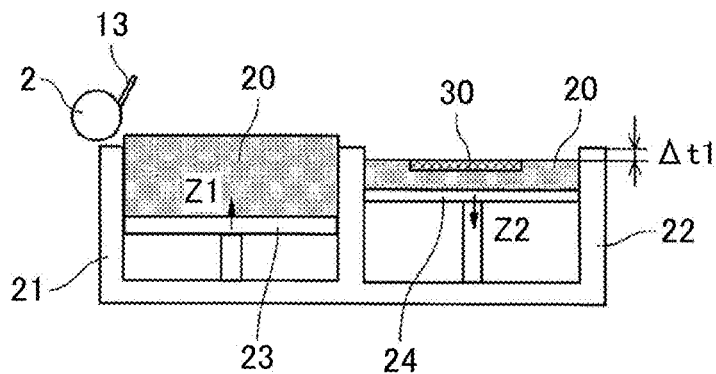
FIGS. 7A, 7B, 7C, 7D, and 7E are views of an operation flow in which a three-dimensional fabricating apparatus fabricates a fabricated object according to an embodiment of the present disclosure.

Fabricating Operation FIGS. 7A, 7B, 7C, 7D, and 7E are diagrams of an operation flow in which the three-dimensional fabricating apparatus 601 fabricates a fabricated object. FIG. 7A illustrates a state in which the first fabrication layer 30 is formed on the fabrication stage 24 of the fabrication chamber 22. When the next fabrication layer 30 is formed on the first fabrication layer 30, as illustrated in FIG. 7A, the supply stage 23 of the supply chamber 21 is raised in a Z1 direction, and the fabrication stage 24 of the fabrication chamber 22 is lowered in a Z2 direction. At this time, the lowering distance of the fabrication stage 24 is set such that a distance between an upper surface (surface of a powder layer) of the fabrication chamber 22 and a lower portion (lower tangent portion) of the flattening roller 12 is Δt1. The distance Δt1 corresponds to the thickness of a powder layer 31 to be formed next. The distance Δt1 is preferably about several tens μm to 100 μm.

Figure 7B:
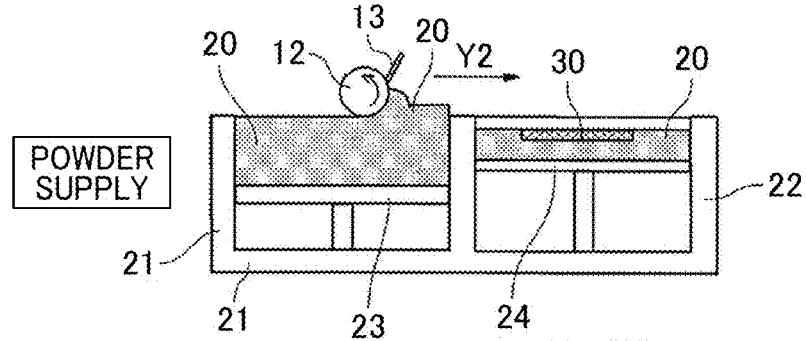

Next, as illustrated in FIG. 7B, the flattening roller 12 is moved in a Y2 direction toward the fabrication chamber 22 while the flattening roller 12 is rotated in a forward direction (i.e., a direction indicated by arrow inside the flattening roller 12 in FIG. 7B). Thus, the powder 20 located above the upper surface level of the supply chamber 21 is transferred and supplied to the fabrication chamber 22 (powder supply).

Figure 7C:
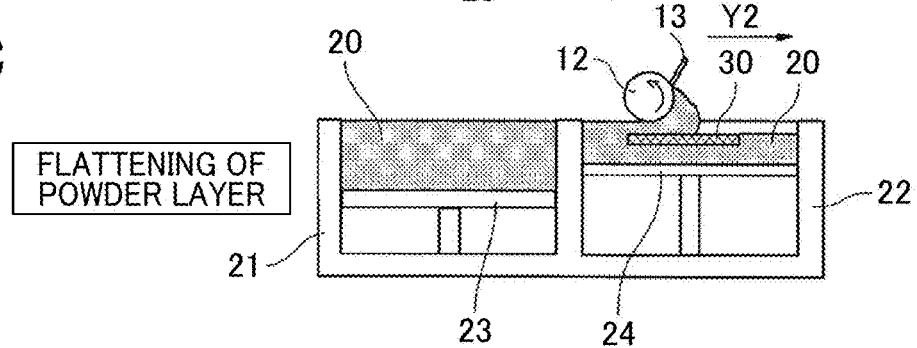
Figure 7D:
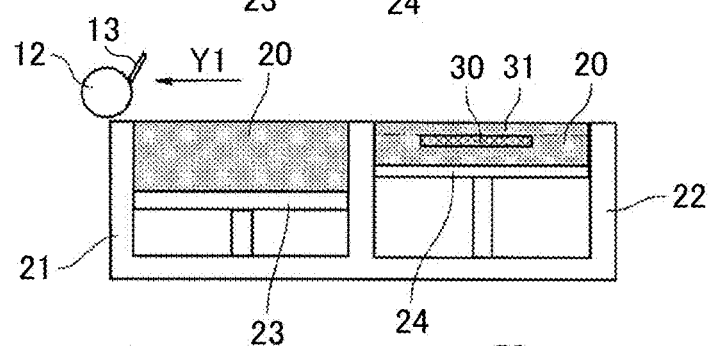

Furthermore, as illustrated in FIG. 7C, the flattening roller 12 is moved in parallel with the stage surface of the fabrication stage 24 of the fabrication chamber 22 to form, as illustrated in FIG. 7D, the powder layer 31 having the predetermined thickness Δt1 on the fabrication layer 30 of the fabrication stage 24 (flattening). After the powder layer 31 is formed, the flattening roller 12 is moved in the Y1 direction and returned to the initial position as illustrated in FIG. 7D.

In the present embodiment, the flattening roller 12 can move while maintaining the constant distance from the upper surface levels of the fabrication chamber 22 and the supply chamber 21. The flattening roller 12 can move while maintaining the constant distance from the upper surface levels of the fabrication chamber 22 and the supply chamber 21. Therefore, while conveying the powder 20 onto the fabrication chamber 22 by the flattening roller 12, the powder layer 31 having the uniform thickness Δt1 can be formed on the fabrication chamber 22 or on the fabrication layer 30 that has been already formed.

Figure 7E:
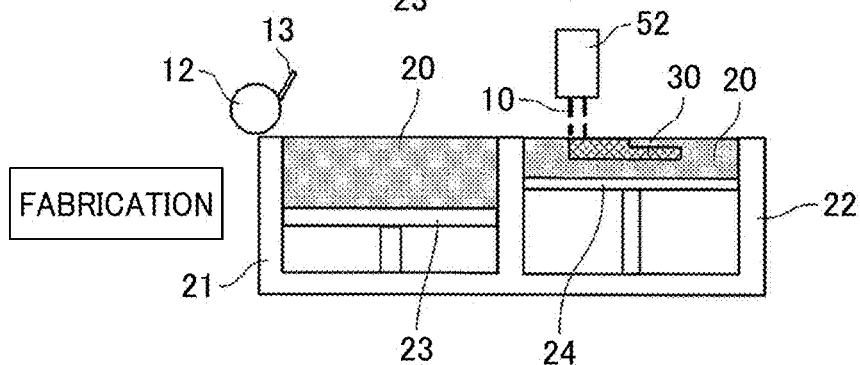

Then, as illustrated in FIG. 7E, droplets of fabrication liquid 10 are discharged from the head 52 of the liquid discharge unit 50 to form and laminate the next fabrication layer 30 on the powder layer 31 (fabrication).

Note that, for the fabrication layer 30, for example, when the fabrication liquid 10 discharged from the head 52 is mixed with the powder 20, adhesives contained in the powder dissolve and bond together. Thus, particles of the powder 20 bind together to form the fabrication layer 30.

Subsequently, the above-described step of forming the powder layer 31 by supplying and flattening powder and the above-described step of discharging the fabrication liquid 10 by the heads 52 are repeated to form a new fabrication layer 30. At this time, the new fabrication layer 30 and the fabrication layer 30 thereunder are integrated to constitute a part of a three-dimensional fabricated object.

Thereafter, the forming step of the powder layer 31 by supplying and flattening the powder 20 and the step of discharging the fabrication liquid 10 with the heads 52 are repeated a required number of times to complete the fabrication of the three-dimensional fabrication object (fabricated object).

Behavior of Powder Surface on Landing of Fabrication Liquid 10 in Comparative Examples FIGS. 8A, 8B, 8C, 8D, and 8E illustrate a behavior of a powder surface when droplets of fabrication liquid 10 land on the powder surface during fabrication by a three-dimensional fabricating apparatus according to a comparative example. FIGS. 8A, 8B, 8C, 8D, and 8E are enlarged schematic views of droplets 10a of the fabrication liquid 10 and powder 20 as the fabrication powder.

In FIGS. 8A, 8B, 8C, 8D, and 8E, the powder 20 transferred and supplied from the supply chamber 21 to the fabrication chamber 22 by the flattening roller 12 is accumulated in the fabrication chamber 22 at a density close to a bulk density (a density calculated by filling the powder in a container having a predetermined volume and setting the internal volume as a volume). However, the density of the powder 20 depends on the material or the particle size distribution of the powder 20.

Figure 8A:
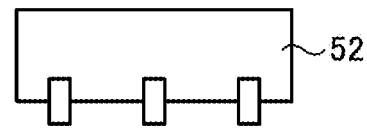
FIGS. 8A, 8B, 8C, 8D, and 8E are enlarged schematic views of droplets of fabrication liquid and powder particles of fabrication powder according to an embodiment of the present disclosure.
Figure 8A:
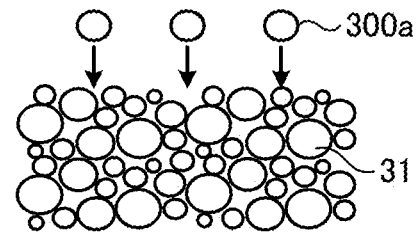
Figure 8B:
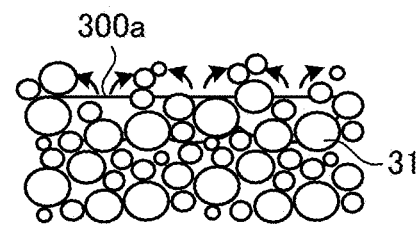

FIG. 8A is a diagram illustrating a state in which droplets 10a discharged from a liquid discharge head 52 are dropped onto a powder layer 31. FIG. 8B is a diagram illustrating a state in which the droplets 10a land on the powder layer 31. In the case of the present comparative example, a part of the powder on the surface of the powder layer 31 is flicked off by the kinetic energies of the droplets 10a as illustrated in FIG. 8B. As a result, asperities are formed on the surface of the powder layer 31 as illustrated in FIG. 8C.

Figure 8C:
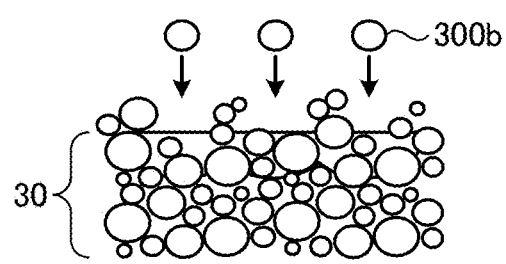
Figure 8D:
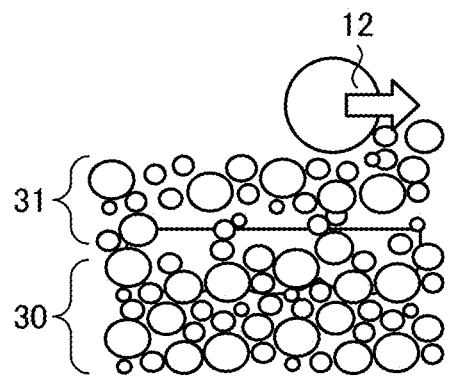
Figure 8E:
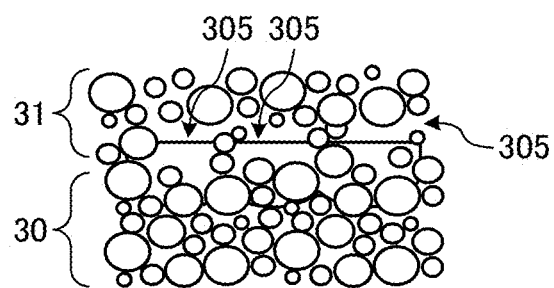

Next, FIG. 8C is a diagram illustrating a state in which droplets 10b as second droplets are dropped. FIG. 8D is a diagram illustrating a state in which powder is transferred and supplied from the supply chamber 21 to the fabrication chamber 22 and accumulated in the fabrication chamber 22. As illustrated in FIG. 8C, gaps (voids) are formed in the fabrication layer 30 due to the asperities that have been formed when the droplets 10a land on the powder layer 30. In the above-described state, when new powder is laminated by the flattening roller 12 as illustrated in FIG. 8D, gaps 305 are formed between the fabrication layer 30 that has been formed and a newly laminated powder layer 31 as illustrated in FIG. 8E, thus causing the density of the fabricated object to be reduced.

Further, the powder flicked off when the droplets 10a land on the powder layer 31 adheres to the nozzle surface of the liquid discharge head 52 moving above the powder layer 31. As a result, non-discharge or discharge bending (deviation of discharge position) of the droplets of the liquid discharge head 52 occurs and a streak-like defect occurs in the fabricated object.

Droplet Discharge Control According to Embodiment

Next, droplets discharge control in the three-dimensional fabricating apparatus 601 according to an embodiment of the present disclosure is described with reference to FIGS. 9A, 9B, 9C, 9D, and 9E. FIG. 9A is a diagram illustrating a state in which droplets 10a discharged from a liquid discharge head 52 are dropped onto a powder layer 31. FIG. 9B is a diagram illustrating a state in which the droplets 10a land on the powder layer 31. FIG. 9C is a diagram illustrating a state in which droplets 10b as second droplets are dropped. FIG. 9D is a diagram illustrating a state in which powder is transferred and supplied from the supply chamber 21 to the fabrication chamber 22 and accumulated in fabrication chamber 22.

In the three-dimensional fabricating apparatus 601 according to the present embodiment, the droplets 10a land on the powder layer 31 after the powder layer 31 is formed. The droplets 10b as the second droplets land on a region at least partially overlapping with a region on which the droplets 10b have landed. Thereafter, the next powder layer 31 is formed. That is, after the powder layer 31 is formed, droplets discharged from the head 52 are dropped so that a plurality of regions on which the droplets land at least partially overlap before the next powder layer 31 is formed.

In the case of the three-dimensional fabricating apparatus 601 according to the present embodiment, the head drive controller 508, with the drive control of the CPU 501, controls the head 52 so that the head 52 discharges the droplets 10a as the first droplets having smaller kinetic energy than the droplets 10b as the second droplets as illustrated in FIG. 9A. A plurality of droplets is discharged to each one pixel on the powder layer 31. That is, the droplets 10b as the second droplets are discharged so that at least some of the droplets 10b overlaps the droplets 10a as the first droplets.

When two or more droplets 10b as the second droplets are discharged so that at least a part of the region on which the droplets 10b land overlaps the region on which the droplets 10a have landed, preferably the head 52 is controlled so that the kinetic energy of the nth droplet is smaller than the kinetic energy of the (n+1)-th droplet. In other words, the head 52 is controlled so that the (n+1)-th droplet has a larger kinetic energy than the kinetic energy of the nth droplet. FIG. 9A illustrates droplets 10a having a small mass as an example of a droplet having a small kinetic energy.

When the above-described droplets 10a land on the powder layer 31, the kinetic energy of the droplets 10a is small. Therefore, as illustrated in FIG. 9B, the number of powder particles flicked off from the surface of the powder layer 31 and the speed of the flicked powder particles are small. As a result, the asperities of the powder layer 31 after the droplets 10a land on the powder layer 31 becomes small.

Next, the head drive controller 508, with the drive control of the CPU 501, controls the head 52 so that the head 52 discharges the droplets 10b as the second droplets having normal kinetic energy as illustrated in FIG. 9C. The droplets 10b as the second droplets have larger kinetic energy than the droplets 10a as the first droplets. That is, the three-dimensional fabricating apparatus 601 according to the present the embodiment discharges the droplets 10a as the first droplets as droplets having a smaller size than normal droplets, and discharges droplets 10b having a normal size after the second droplets.

When the droplets 10b as the second droplets are dropped, the droplets 10a as the first droplets have penetrated into the powder layer 31, as illustrated in FIG. 9C. Thus, the powder particles on the surface of the powder layer 31 are unlikely to move. As a result, even when the droplets 10b as the second droplets land on the powder layer 31, the powder particles on the surface of the powder layer 31 are hardly flicked off and there are few asperities formed on the powder layer 31, and the formed asperities are also small.

In this state, when the flattening roller 12 accumulates the powder as illustrated in FIG. 9D, the asperities of the powder layer 31 being small can reduce the size of the gaps formed in the fabrication layer 30. Such small gaps, as illustrated in FIG. 9E, can increase the density of the fabricated object. Thus, a fabricated object having high properties such as strength, durability, and thermal conductivity can be obtained.

In addition, the three-dimensional fabricating apparatus 601 according to the present embodiment can reduce the flying up of the powder 20. Thus, the adhesion of the powder 20 to the nozzle surface can be reduced and the discharge failure such as the discharge bending or non-discharge can be prevented, thus preventing the streak-like defect from occurring in the fabricated object.

The CPU 501 illustrated in FIG. 6 executes at least following three steps based on a droplet discharge program stored in a storage device such as the ROM 502. First, the CPU 501 executes a powder layer forming step to form the powder layer 31. Second, the CPU 501 executes a first fabrication liquid discharging step to discharge the fabrication liquid 10 onto the powder layer 31. Third, the CPU 501 executes a second fabrication liquid discharging step to discharge the fabrication liquid 10 having a higher kinetic energy than the fabrication liquid 10 discharged in the first fabrication liquid discharging step to a region at least partially overlapping with a region to which the fabrication liquid 10 is discharged in the first fabrication liquid discharging step. Thus, the above-described effects can be obtained.

Prototype Experimental Results

Prototype experimental results of the above-described three-dimensional fabricating apparatus 601 are described below. In this prototype experiment, a silicon-based aluminum alloy (AlSi10Mg) was used as the powder 20. The size of the fabricated object used for the experiment is 40 mm in the main scanning direction, 20 mm in the sub-scanning direction, and 5 mm in the layering direction. The fabricated object was fabricated under fabrication conditions described in Tables 1 to 11 below.

First, Table 1 below describes an example in which the head drive controller 508 controls such that the discharge amount of the droplets 10a as the first droplets is half of the discharge amount of the droplets 10b as the second droplets (8 pL and 16 pL, respectively), and the discharge speed of the droplets 10a as the first droplets is about two thirds of the discharge speed of the droplets 10b as the second droplets (5 m/s and 7 m/s, respectively) in a same scan (the amount and speed of discharge of the droplets 10a and 10b in the same scan are changed).

The discharge amount of the droplets 10a as the first droplets is smaller than the discharge amount of the droplets 10b as the second droplets and the discharge speed of the droplets 10a as the first droplets is slower than the discharge speed of the droplets 10b as the second droplets. Thus, the kinetic energy of the droplets 10a as the first droplets can be made smaller, and the flying up of the powder can be restrained.

TABLE 1

|  | First droplets | Second droplets |
| --- | --- | --- |
| Lamination pitch [μm] | 84.7 | |
| Number of discharging of droplets | 2 | |
| Same scan or different scans | Same scan | |
| Specific gravity [g/cm$^3$] | 1.16 | 1.16 |
| Surface energy [mN/m] | 32 | 32 |
| Discharge amount [pL] | 8 | 16 |
| Discharge speed [m/s] | 5 | 7 |
| Kinetic energy [J] | 0.12 | 0.45 |
| Resolution (main scanning direction × sub-scanning direction) [dpi$^2$] | 300 × 300 | 300 × 300 |

Next, Table 2 below describes an example in which the head drive controller 508 controls such that the discharge amount of the droplets 10a as the first droplets is set to half of the discharge amount of the droplets 10b as the second droplets in a same scan, and the discharge speed and the like are set to be the same between the droplets 10a and the droplets 10b (only the discharge amounts of the droplets 10a and 10b in the same scan are changed).

Setting the discharge amount of the first droplets to be smaller than the discharge amount of the second droplets can reduce the kinetic energy of the first droplets and restrain flying up of the powder.

TABLE 2

|  | First droplets | Second droplets |
| --- | --- | --- |
| Lamination pitch [μm] | 84.7 | |
| Number of discharging of droplets | 2 | |
| Same scan or different scans | Same scan | |

TABLE 2-continued

|  | First droplets | Second droplets |
|---|---|---|
| Specific gravity [g/cm$^3$] | 1.16 | 1.16 |
| Surface energy [mN/m] | 32 | 32 |
| Discharge amount [pL] | 8 | 16 |
| Discharge speed [m/s] | 6 | 6 |
| Kinetic energy [J] | 0.17 | 0.33 |
| Resolution (main scanning direction × sub-scanning direction) [dpi$^2$] | 300 × 300 | 300 × 300 |

Next, Table 3 below describes an example in which the head drive controller 508 controls such that the discharge speed of the droplets 10a as the first droplets is set to about two thirds of the discharge speed of the droplets 10b as the second droplets (5 m/s and 7 m/s, respectively) in the same scan, and the discharge amount and the like are set to be the same between the first droplets and the second droplets (only the discharge speed of the first droplets and the second droplets in the same scan are changed).

Setting the discharge speed of the first droplets to be lower than the discharge speed of the second droplets can reduce the kinetic energy of the first droplets and restrain the flying up of the powder.

TABLE 3

The discharge speed of the droplets 10a as the first droplets is smaller than the discharge speed of the droplets 10b as the second droplets. Thus, the kinetic energy of the droplets 10a as the first droplets is smaller than the kinetic energy of the droplets 10b as the second droplets.

|  | First droplets | Second droplets |
|---|---|---|
| Lamination pitch [μm] | 84.7 | |
| Number of discharging of droplets | 2 | |
| Same scan or different scans | Same scan | |
| Specific gravity [g/cm$^3$] | 1.16 | 1.16 |
| Surface energy [mN/m] | 32 | 32 |
| Discharge amount [pL] | 12 | 12 |
| Discharge speed [m/s] | 5 | 7 |
| Kinetic energy [J] | 0.17 | 0.34 |
| Resolution (main scanning direction × sub-scanning direction) [dpi$^2$] | 300 × 300 | 300 × 300 |

Next, Table 4 below is an example in which the head drive controller 508 changes the discharge amount and the discharge speed of first droplets 10a, second droplets 10b, and third droplets 10c in a same scan. In this example, the head drive controller 508 controls the discharge amount and the discharge speed of the droplets 10a, 10b, and 10c such that the first droplets (droplets 10a)<the second droplets (droplets 10b)<the third droplets (droplets 10c). For example, the head drive controller 508 controls the discharge amounts of the first droplets (droplets 10a), the second droplets (droplets 10b), and the third droplets (droplets 10c) to 6 pL, 8 pL, and 16 pL, respectively. In addition, the head drive controller 508 controls the discharge speeds of the first droplets (droplets 10a), the second droplets (droplets 10b), and the third droplets (droplets 10c) to 5 m/s, 6 m/s, and 7 m/s, respectively (the amounts and speeds of the first droplets 10a, the second droplets 10b, and the third droplets 10c in the same scan are changed).

Setting the discharge amounts and the discharge speeds of the first droplets, the second droplets, and the third droplets such that the first droplets<the second droplets<the third droplet can control the kinetic energy to be enlarged in a stepwise manner from the first droplets to the third droplets, and can restrain the flying up of the powder.

TABLE 4

Cases of three droplets are compared.

|  | First droplets | Second droplets | Third droplets |
|---|---|---|---|
| Lamination pitch [μm] | | 84.7 | |
| Number of discharging of droplets | | 3 | |
| Same scan or different scans | | Same scan | |
| Specific gravity [g/cm$^3$] | 1.16 | 1.16 | 1.16 |
| Surface energy [mN/m] | 32 | 32 | 32 |
| Discharge amount [pL] | 6 | 8 | 10 |
| Discharge speed [m/s] | 5 | 6 | 7 |
| Kinetic energy [J] | 0.09 | 0.17 | 0.28 |
| Resolution (main scanning direction × sub-scanning direction) [dpi$^2$] | 300 × 300 | 300 × 300 | 300 × 300 |

Next, Table 5 below describes an example in which the head drive controller 508 controls such that the discharge amount of the droplets 10a as the first droplets is set to half of the discharge amount of the droplets 10b as the second droplets (8 pL and 16 pL, respectively) in different scans and the discharge speed of the droplets 10a as the first droplets is set to about two thirds of the discharge speed of the droplets 10b as the second droplets (5 m/s and 7 m/s, respectively) in the different scans (in other words, the discharge amounts and discharge speeds of the first droplets and the second droplets in the different scans are changed).

Discharging the first droplets and the second droplets in different scans allows the first droplets to be sufficiently wet and spread on the powder before the second droplets land on the powder, and can restrain flying up of the powder particles when the second droplets land on the powder.

TABLE 5

|  | First droplets | Second droplets |
|---|---|---|
| Lamination pitch [μm] | 84.7 | |
| Number of discharging of droplets | 2 | |
| Same scan or different scans | Different scans | |
| Specific gravity [g/cm$^3$] | 1.16 | 1.16 |
| Surface energy [mN/m] | 32 | 32 |
| Discharge amount [pL] | 8 | 16 |
| Discharge speed [m/s] | 5 | 7 |
| Kinetic energy [J] | 0.12 | 0.45 |
| Resolution (main scanning direction × sub-scanning direction) [dpi$^2$] | 300 × 300 | 300 × 300 |

Next, Table 6 below describes an example in which the head drive controller 508 sets the resolution of the droplets 10a as the first droplets in the main scanning direction and the sub-scanning direction to be higher than the resolution of the droplets 10b as the second droplets in the same scan, sets the discharge amount of the droplets 10a as the first droplets to be greatly reduced to one eighths of the discharge amount of the droplets 10b as the second droplets (2 pL and 16 pL, respectively), and sets the discharge speed of the droplets 10a as the first droplets is about two thirds of the discharge speed of the droplets 10b as the second droplets (5 m/s and 7 m/s, respectively) (in other words, the resolution and discharge amount of the droplets 10a are significantly reduced and the discharge speeds of the droplets 10a and the droplet 10b are changed in the same scan).

TABLE 6

|  | First droplets | Second droplets |
|---|---|---|
| Lamination pitch [μm] | 84.7 | |
| Number of discharging of droplets | 2 | |

TABLE 6-continued

|  | First droplets | Second droplets |
|---|---|---|
| Same scan or different scans | Different scans | |
| Specific gravity [g/cm$^3$] | 1.16 | 1.16 |
| Surface energy [mN/m] | 32 | 32 |
| Discharge amount [pL] | 2 | 16 |
| Discharge speed [m/s] | 5 | 7 |
| Kinetic energy [J] | 0.03 | 0.45 |
| Resolution (main scanning direction × sub-scanning direction) [dpi$^2$] | 600 × 600 | 300 × 300 |

Next, Table 7 below describes an example in which the head drive controller 508 sets the resolution of the droplets 10a as the first droplets in the main scanning direction to be higher than the resolution of the droplets 10b as the second droplets in a same scan, the discharge amount of the droplets 10a as the first droplets to be smaller by one fourth than the discharge amount of the droplets 10b as the second droplets (4 pL and 16 pL, respectively), and the discharge speed of the droplets 10a as the first droplets to be about two thirds of the discharge speed of the droplets 10b as the second droplets (5 m/s and 7 m/s, respectively) (in other words, the resolution and discharge amount of the droplets 10a are reduced and the discharge speed of the droplets 10a and the droplets 10b are changed in the same scan).

When the discharge amount of the droplets 10a as the first droplets is decreased and the resolution of the droplets 10a is increased, the penetration of the droplets 10a in the powder surface direction increases with respect to the penetration depth in the lamination direction. On the other hand, it is necessary for the fabrication liquid 10 to sufficiently permeate in the lamination direction and permeate between the lamination layers to obtain a fabricated object. Therefore, setting the resolution of the droplets 10a as the first droplets to be higher than the resolution of the droplets 10b as the second droplets can sufficiently wet the powder surface with the fabrication liquid 10 before the droplets 10b as the second droplets land on the powder surface. Thus, flying up of the powder can be restrained when the droplets 10b as the second droplets lands on the powder surface. Further, setting the discharge amount of the droplets 10b as the second droplets to be larger than the discharge amount of the droplets 10a as the first droplets can make the resolution of the droplets 10b as the second droplets to be lower than the resolution of the droplets 10a as the first droplets, thus ensuring penetration of the fabrication liquid 10 in the laminating direction.

TABLE 7

The resolution of the droplets 10a as the first droplets is higher than the resolution of the droplets 10b as the second droplet only in the main scanning direction.

|  | First droplets | Second droplets |
|---|---|---|
| Lamination pitch [μm] | 84.7 | |
| Number of discharging of droplets | 2 | |
| Same scan or different scans | Different scans | |
| Specific gravity [g/cm$^3$] | 1.16 | 1.16 |
| Surface energy [mN/m] | 32 | 32 |
| Discharge amount [pL] | 4 | 16 |
| Discharge speed [m/s] | 5 | 7 |
| Kinetic energy [J] | 0.06 | 0.45 |
| Resolution (main scanning direction × sub-scanning direction) [dpi$^2$] | 600 × 300 | 300 × 300 |

Next, Table 8 below describes an example in which droplets having different specific gravities are used as the droplets 10a as the first droplets and the droplets 10b as the second droplets. As an example, in the case of Table 8, droplets having a specific weight of 1.04 g/cm$^3$ were used as the droplets 10a as the first droplets, and droplets having a specific weight of 1.16 g/cm$^3$ were used as the droplets 10b as the second droplets. Table 8 describes an example in which the head drive controller 508 sets the discharge amount of the droplets 10a as the first droplets to be reduced to half of the discharge amount of the droplets 10b as the second droplets (8 pL and 16 pL, respectively) and the discharge speed of the droplets 10a as the first droplets to be about two thirds of the discharge speed of the droplets 10b as the second droplets (5 m/s and 7 m/s, respectively) in a same scan (in other words, different liquid materials were used in the same scan and the discharge amounts and the discharge speeds of the droplets 10a and 10b were changed).

TABLE 8

Different liquid materials were used for the droplets 10a as the first droplets and the droplets 10a as the second droplets. The specific gravity of the droplets 10a as the first droplets is smaller than the specific gravity of the droplets 10b as the second droplet.

|  | First droplets | Second droplets |
|---|---|---|
| Lamination pitch [μm] | 84.7 | |
| Number of discharging of droplets | 2 | |
| Same scan or different scans | Same scan | |
| Specific gravity [g/cm$^3$] | 1.04 | 1.16 |
| Surface energy [mN/m] | 32 | 32 |
| Discharge amount [pL] | 8 | 16 |
| Discharge speed [m/s] | 5 | 7 |
| Kinetic energy [J] | 0.10 | 0.45 |
| Resolution (main scanning direction × sub-scanning direction) [dpi$^2$] | 300 × 300 | 300 × 300 |

Next, Table 9 below describes an example in which droplets having different specific gravities were used as the droplets 10a as the first droplets and the droplets 10b as the second droplets. As an example, in the case of Table 9, droplets having a specific gravity of 1.04 g/cm3 were used as the droplets 10a as the first droplets and droplets having a specific gravity of 1.16 g/cm3 were used as the droplets 10b as the second droplets. Table 9 describes an example in which the surface energy of the droplets 10a as the first droplets is smaller than the surface energy of the droplets 10b as the second droplets, and the surface energy of the droplets 10a as the first droplets is 26 mN/m and the surface energy of the droplets 10b as the second droplets is 32 mN/m.

Further, Table 9 describes an example in which the head drive controller 508 sets the discharge amount of the droplets 10a as the first droplets to be reduced to half of the discharge amount of the droplets 10b as the second droplets (8 pL and 16 pL, respectively) and the discharge speed of the droplets 10a as the first droplets to be about two thirds of the discharge speed of the droplets 10b as the second droplets (5 m/s and 7 m/s, respectively) in a same scan (in other words, different liquid materials were used in the same scan and the kinetic energies, the discharge amounts and the discharge speeds of the droplets 10a and 10b were changed).

TABLE 9

Different liquid materials were used for the droplets 10a as the first droplets and the droplets 10b as the second droplets. The surface energy of the droplets 10a as the first droplet is smaller than the surface energy of the droplets 10a as the second droplets.

| | First droplets | Second droplets |
|---|---|---|
| Lamination pitch [μm] | 84.7 | |
| Number of discharging of droplets | 2 | |
| Same scan or different scans | Same scan | |
| Specific gravity [g/cm³] | 1.04 | 1.16 |
| Surface energy [mN/m] | 26 | 32 |
| Discharge amount [pL] | 8 | 16 |
| Discharge speed [m/s] | 5 | 7 |
| Kinetic energy [J] | 0.10 | 0.45 |
| Resolution (main scanning direction × sub-scanning direction) [dpi²] | 300 × 300 | 300 × 300 |

In contrast to the Tables 1 to 9 as described above, Tables 10 and 11 describe experimental results of comparative examples. That is, Table 10 below describes an example in which the droplets 10a as the first droplets and the droplets 10b as the second droplets were discharged under the same conditions without changing the discharge amount, the discharge speed, and the like. Similarly, Table 11 below describes an example in which the droplets 10a as the first droplets, the droplets 10b as the second droplets, and the droplets 10c as the third droplets were discharged under the same conditions without changing the discharge amount, the discharge speed, and the like.

TABLE 10

| | First droplets | Second droplets |
|---|---|---|
| Lamination pitch [μm] | 84.7 | |
| Number of discharging of droplets | 2 | |
| Same scan or different scans | Same scan | |
| Specific gravity [g/cm³] | 1.16 | 1.16 |
| Surface energy [mN/m] | 32 | 32 |
| Discharge amount [pL] | 12 | 12 |
| Discharge speed [m/s] | 7 | 7 |
| Kinetic energy [J] | 0.34 | 0.34 |
| Resolution (main scanning direction × sub-scanning direction) [dpi²] | 300 × 300 | 300 × 300 |

TABLE 11

| | First droplets | Second droplets | Third droplets |
|---|---|---|---|
| Lamination pitch [μm] | 84.7 | | |
| Number of discharging of droplets | 3 | | |
| Same scan or different scans | Same scan | | |
| Specific gravity [g/cm³] | 1.16 | 1.16 | 1.16 |
| Surface energy [mN/m] | 32 | 32 | 32 |
| Discharge amount [pL] | 8 | 8 | 8 |
| Discharge speed [m/s] | 7 | 7 | 7 |
| Kinetic energy [J] | 0.23 | 0.23 | 0.23 |
| Resolution (main scanning direction × sub-scanning direction) [dpi²] | 300 × 300 | 300 × 300 | 300 × 300 |

Table 12 below summarizes the density ratios of the fabricated objects, the presence or absence of the streak-like defect in the fabricated objects, and the kinetic energy of each turn of droplets in the experiments under the conditions described in each of the tables above.

TABLE 12

| | Density ratio [%] | Presence of streak-like defect of fabricated object | Kinetic energy [J] First droplets | Second droplets | Third droplets |
|---|---|---|---|---|---|
| TABLE 1 | 52.9 | None | 0.12 | 0.45 | — |
| TABLE 2 | 53.5 | None | 0.17 | 0.33 | — |
| TABLE 3 | 53.6 | None | 0.17 | 0.34 | — |
| TABLE 4 | 54.8 | None | 0.09 | 0.17 | 0.28 |
| TABLE 5 | 54.6 | None | 0.12 | 0.45 | — |
| TABLE 6 | 54.2 | None | 0.03 | 0.45 | — |
| TABLE 7 | 52.3 | None | 0.06 | 0.45 | — |
| TABLE 8 | 53.5 | None | 0.10 | 0.45 | — |
| TABLE 9 | 54.4 | None | 0.10 | 0.45 | — |
| TABLE 10 | 48.0 | Present | 0.34 | 0.34 | — |
| TABLE 11 | 49.1 | Present | 0.23 | 0.23 | 0.23 |

The density ratios of the fabricated objects described in Table 12 are ratios of the densities of the fabricated objects with respect to the densities of AlSi10Mg used as the powder by using the Archimedes principle. In addition, the presence or absence of the streak-like defect of the fabricated objects generated due to non-discharge or discharge bending of the droplets from the liquid discharge head 52 was determined by visual observation of the fabricated objects.

As can be seen from Table 12, in the case of the examples of Table 10 and Table 11 as the comparative examples, the kinetic energy of all the droplets is the same, and the density of the fabricated objects is low with the density ratio being 48.0% or 49.1%. In addition, the flying powder adheres to the discharge nozzle, and streak-like defects are generated in the fabricated objects.

On the other hand, in the examples of Tables 1 to 9 in which the kinetic energy of the droplets 10a as the first droplets was reduced, the density ratio of the fabricated objects was significantly increased to 52.3% to 54.8%. In addition, the flying up of the powder was restrained and the streak-like defects in the fabricated objects were prevented from being generated.

EFFECTS OF EMBODIMENTS

As apparent from the above description, the three-dimensional fabricating apparatus 601 according to the above-described embodiments of the present disclosure is a three-dimensional fabricating apparatus of a fabricating liquid discharge method that discharges the fabrication liquid 10 to the laminated powder and solidifies the fabrication liquid 10 to fabricate the fabricated object, and sets the kinetic energy of the droplets 10a as the first droplets of the fabrication liquid 10 to be smaller than the kinetic energy of the droplets 10b as the second and subsequent droplets of the fabrication liquid 10 with respect to one pixel.

As a result, the droplets 10a as the first droplets of the fabrication liquid 10 lands on the powder surface with small kinetic energy. Thus, the flying up of the powder can be reduced. In addition, when the droplets 10b as the second and subsequent droplets of the fabrication liquid 10 land on the powder surface, the powder surface is wet with the droplets 10a as the first droplets of the fabrication liquid 10. Thus, the powder is unlikely to move. For this reason, the flying up of the powder particles can be reduced even when the fabrication liquid 10 as the second and subsequent droplets land on the powder surface. Therefore, a disadvantage that the powder surface is roughened due to flying up of the powder particles can be prevented, and the low density of the fabricated objects can be prevented.

In addition, the amount of the powder particles flying up from the powder surface can be reduced when the droplets land on the powder surface. Such a configuration can prevent the powder particles from flying up and adhering to the nozzle surface of the liquid discharge head moving above the powder surface. Thus, a disadvantage that discharge bending or discharge failure hampers normal image formation can be prevented.

The above-described embodiments are presented as examples and are not intended to limit the scope of the present disclosure. The above-described embodiments can be implemented in other various forms, and various omissions, replacements, and changes can be made without departing from the scope of the present disclosure. In addition, the embodiments and modifications or variations thereof are included in the scope and the gist of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A fabricating apparatus comprising:
    a powder layer forming device configured to form a powder layer;
    a fabrication liquid discharge device configured to discharge fabrication liquid onto the powder layer; and
    processing circuitry configured to
        control the powder layer forming device to form the powder layer, and
        control the fabrication liquid discharge device to discharge the fabrication liquid with a first kinetic energy and then discharge the fabrication liquid with a second kinetic energy higher than the first kinetic energy,
    wherein the processing circuitry is configured to control discharge of the fabrication liquid discharge device such that, when n is a natural number and any droplet of the fabrication liquid is an n-th droplet, a kinetic energy of the n-th droplet is lower than a kinetic energy of an (n+1)-th droplet.

2. The fabricating apparatus according to claim 1,
    wherein the processing circuitry is configured to control discharge of the fabrication liquid discharge device such that a discharge amount of a first droplet of the fabrication liquid discharged in advance of a second droplet of the fabrication liquid is smaller than a discharge amount of the second droplet.

3. The fabricating apparatus according to claim 1,
    wherein the processing circuitry is configured to control discharge of the fabrication liquid discharge device such that a discharge speed of a first droplet of the fabrication liquid discharged in advance of a second droplet of the fabrication liquid is lower than a discharge speed of the second droplet.

4. The fabricating apparatus according to claim 1,
    wherein the processing circuitry is configured to control the discharge of the fabrication liquid discharge device such that a discharge speed of the n-th droplet is slower than a discharge speed of the (n+1)-th droplet.

5. The fabricating apparatus according to claim 1,
    wherein the processing circuitry is configured to control the discharge of the fabrication liquid discharge device such that a discharge amount of the n-th droplet is smaller than a discharge amount of the (n+1)-th droplet.

6. The fabricating apparatus according to claim 1,
    wherein the processing circuitry is configured to control the fabrication liquid discharge device to discharge a first droplet in a first scan and then discharge a second droplet of the fabrication liquid in a second scan different from the first scan.

7. The fabricating apparatus according to claim 1,
    wherein the processing circuitry is configured to control discharge of the fabrication liquid discharge device such that a resolution corresponding to a discharge amount of a first droplet of the fabrication liquid discharged in advance of a second droplet of the fabrication liquid is higher than a resolution corresponding to a discharge amount of the second droplet.

8. The fabricating apparatus according to claim 7,
    wherein the processing circuitry is configured to control the discharge of the fabrication liquid discharge device such that a resolution corresponding to the discharge amount of the first droplet in a main scanning direction of the fabrication liquid discharge device is higher than a resolution corresponding to a discharge amount of the second droplet in the main scanning direction.

9. The fabricating apparatus according to claim 1,
    wherein the processing circuitry is configured to control the fabrication liquid discharge device to discharge different types of fabrication liquids for a first droplet of the fabrication liquid and a second droplet of the fabrication liquid discharged after the first droplet.

10. The fabricating apparatus according to claim 9,
    wherein a specific gravity of the first droplet is smaller than a specific gravity of the second droplet.

11. The fabricating apparatus according to claim 9,
    wherein a surface energy of the first droplet is smaller than a surface energy of the second droplet.

12. The fabricating apparatus according to claim 1,
    wherein
        the fabrication liquid with the first kinetic energy are first droplets,
        the fabrication liquid with the second kinetic energy are second droplets,
        the processing circuitry is further configured to
            discharge the second droplets such that at least some of the second droplets overlap contact points of the first droplets, the contact points being on the powder layer, and
            discharge the first and second droplets in separate, discrete discharges,
        the first droplets are configured to solidify an upper partial portion of the powder layer, and
        the second droplets are configured to solidify the powder layer below the upper partial portion of the powder layer and form a fabrication layer of a three-dimensional fabricated object.

13. A fabricating method comprising:
    forming a powder layer;
    first discharging first fabrication liquid with a first kinetic energy to a first region of the powder layer; and
    second discharging second fabrication liquid with a second kinetic energy higher than the first kinetic energy to a second region at least partially overlapping with the first region,
    wherein when n is a natural number and any fabrication liquid is n-th fabrication liquid, a kinetic energy of the n-th fabrication liquid is lower than a kinetic energy of (n+1)-th fabrication liquid.

14. The fabricating method according to claim 13, wherein a discharge amount of the first fabrication liquid discharged in advance of the second fabrication liquid is smaller than a discharge amount of the second fabrication liquid.

15. The fabricating method according to claim 13, wherein a discharge speed of the first fabrication liquid discharged in advance of the second fabrication liquid is lower than a discharge speed of the second fabrication liquid.

16. The fabricating method according to claim 13, wherein the first discharging and the second discharging are performed by different scans.

17. The fabricating method according to claim 13, wherein a resolution corresponding to the discharge amount of the first fabrication liquid discharged in advance of the second fabrication liquid is higher than a resolution corresponding to the discharge amount of the second fabrication liquid.

18. The fabricating method according to claim 17, wherein the resolution corresponding to the discharge amount of the first fabrication liquid in a main scanning direction is higher than the resolution corresponding to the discharge amount of the second fabrication liquid in the main scanning direction.

* * * * *